United States Patent [19]

Takahashi

[11] 4,436,023
[45] Mar. 13, 1984

[54] APPARATUS FOR COOKING FOOD AND EXTRACTING SMOKE

[76] Inventor: Kensuke Takahashi, c/o Kabushiki Kaisha Diamond Hotel, 25, Ichibancho, Chiyodaku, Tokyo 102, Japan

[21] Appl. No.: 361,983

[22] Filed: Mar. 25, 1982

[51] Int. Cl.³ .............................................. A47J 37/06
[52] U.S. Cl. ..................................... 99/400; D7/359; D23/151; 55/DIG. 36; 99/401; 99/444; 99/447; 99/450; 126/299 D
[58] Field of Search ................. 99/444, 450, 341, 447, 99/401, 400; 98/115 R; 126/299 D; 55/467, DIG. 36; D7/359, 391, 402; D23/151

[56] References Cited

U.S. PATENT DOCUMENTS

| 92,008 | 6/1869 | Browne | 99/444 |
|---|---|---|---|
| 200,622 | 2/1878 | McConnell | 99/444 |
| D. 246,627 | 12/1977 | Sugiyama | 99/444 X |
| 1,827,956 | 10/1931 | Sharpe | 126/299 D |
| 3,098,924 | 7/1963 | Salton | 99/341 X |
| 3,391,689 | 7/1968 | Roger | 55/DIG. 36 |

FOREIGN PATENT DOCUMENTS

| 620861 | 1/1927 | France | 126/299 D |
|---|---|---|---|
| 41881 | 12/1907 | Switzerland | 55/467 |
| 418262 | 2/1967 | Switzerland | 99/450 |
| 265480 | 2/1927 | United Kingdom . | |
| 404201 | 1/1934 | United Kingdom . | |
| 431231 | 7/1935 | United Kingdom . | |
| 628068 | 8/1949 | United Kingdom . | |
| 941191 | 11/1963 | United Kingdom . | |
| 1053970 | 1/1967 | United Kingdom . | |
| 1475894 | 6/1977 | United Kingdom . | |

*Primary Examiner*—Billy J. Wilhite
*Attorney, Agent, or Firm*—Hill, Van Santen, Steadman & Simpson

[57] ABSTRACT

An apparatus for cooking food and extracting smoke is disclosed comprising a grill for use with a heat source, the grill having an upwardly convex cooking surface with ventilation holes formed therein and a peripheral groove for collecting food juices, and further comprising a hood for collecting smoke supported above a grill on a cooking table and duct work leading from within the hood, through the table and away to external exhaust. The apparatus is suited for restaurant dining room use.

17 Claims, 4 Drawing Figures

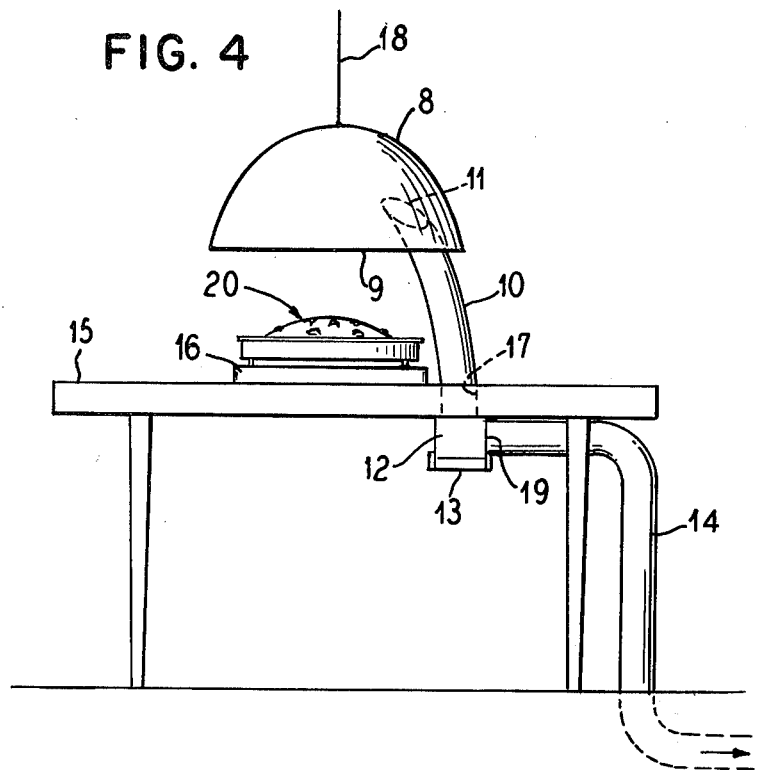

APPARATUS FOR COOKING FOOD AND EXTRACTING SMOKE

BACKGROUND OF THE INVENTION

1. Field of the Invention

This invention relates to an apparatus for broiling meat and other foodstuffs such as fish and vegetables and for extracting smoke caused by such broiling.

2. The Prior Art

It is desirable to provide a grill designed to prevent meat juice from dropping on the fire or heat source under the grill to secure maximum heating effect, to keep smoke generation to a minimum as well as to make the meat juice eatable.

It is also desirable to provide a device suitable for preparing meat and other food while eating at table which may be used together with a device for effective removal of smoke which is generated while meat and other food are broiled on the grill. Such device should be easy to handle and clean and the cost of manufacturing such device should be reasonable.

It is further desirable to provide a device, for broiling meat and other food and removing smoke, for use in a restaurant which is equipped with a ventilation duct and grill mountable tables.

Those devices which have so far been used to broil meat or other food at a dining table include an iron plate placed on the heat source, a pan with a flat bottom, an iron frame having a number of parallel iron bars, or a gridiron. The iron plate and the pan with a flat bottom have drawbacks in that meat broiled thereon tends to be too juicy because of the juice produced not only by meat but also by other foodstuffs such as fish and vegetables while they are broiled on the same plate or in the same pan. Too much juice thus produced tends to harm the taste and flavor of the broiled meat. Since the juice thus produced contains oil and water, these constituents repel each other when heated and stain the table around the grill and clothes of customers and may even give scalds to customers. The conventional gridiron or frame with iron bars and other devices having openings permit juice produced by food when broiled to drop on the heat source, lowering the heat, causing oil thus dropped to burn, preventing even heating and generating much smoke. The food prepared on such devices tends to be dry, partially burned and less tasty.

Heretofore, there has been no attempt to provide a smoke extracting device for each grill that customers use on a dining table to broil meat and other food by themselves in a restaurant. The conventional method of removing smoke to the outside has been an electric fan attached to a wall near the ceiling of the dining room which may be connected with a ventilation duct. Such a fan is not provided specially for the grill on each table, but is for general ventilation of the room. The efficiency in of removing outside smoke produced from the grill is generally very low and customers would be forced to eat in the midst of smoke. Such a conventional device is not only uncomfortable but also is bad for health. In addition, such a conventional device does not help to keep conditions in the restaurant clean and sanitary.

The apparatus of the present invention, as defined by the appended claims, makes it possible to broil meat and other foodstuffs in good condition, keeping an appropriate amount of juice of the prepared food, minimizing the splash of heated oil and water and the generation of smoke, and raising the efficiency of smoke removal.

SUMMARY OF THE INVENTION

According to my invention, a grill for use in conjunction with a heat source is provided having an upwardly convex cooking surface with openings formed therein for heat outlet and ventilation. Juices liberated from the cooking food are collected in a groove surrounding the periphery of the cooking surface.

Furthermore, a smoke extraction device is provided which comprises a hood suspended over a grill and ventilation ductwork having one end opening within the cavity of the hood. The ductwork passes downward from the hood, through a hole in a table, and under and away from the table for external exhaust ventilation. A connector having a removable lid may be provided in the ductwork to allow for cleaning of the interior of the ductwork.

BRIEF DESCRIPTION OF THE DRAWINGS

FIG. 4 shows an embodiment of the grill placed on the table and the smoke extracting device of this invention placed over the grill.

DESCRIPTION OF THE PREFERRED EMBODIMENT

Figure 1:
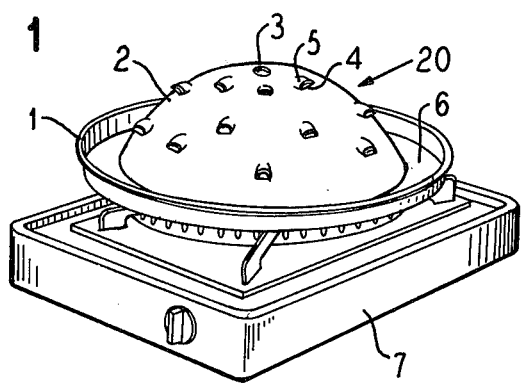
FIG. 1 shows the grill of this invention as placed over a heat source.
Figure 2:
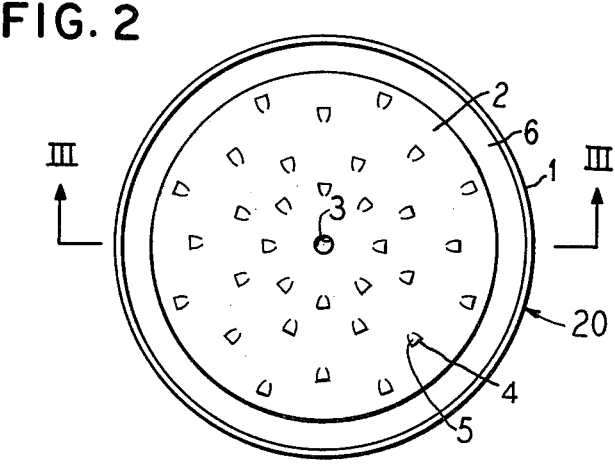
FIG. 2 is a plan view of the grill shown in FIG. 1.
Figure 3:
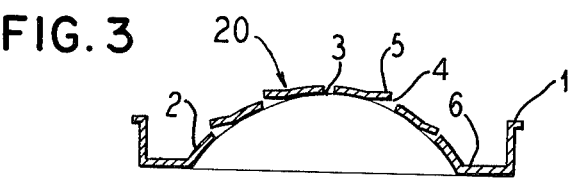
FIG. 3 is a sectional view taken as indicated by the line III—III of FIG. 2.

The grill of the present invention as shown in FIGS. 1-3 is made preferably of iron, and comprises a central convex body 2 having a spherical surface, encircled by a peripheral groove 6 which is defined by a side wall 1. On top of the convex body is a round hole 3 and over the spherical surface of the convex body are provided a number of noses 5 uprising radially at intervals of about 3 to 5 centimeters. Each nose 5 has a ridge of about 2 centimeters which extends from the spherical surface of the convex body in the outward direction which is either horizontal or a little sloping down outwardly and ends with an opening 4 in a substantially vertical plane, which is of either a semicircular or triangular shape, facing outward.

The grill 20 of the present invention is placed over a heat source 7. The top hole 3 of the convex body 2, having a diameter of about 2 centimeters, is not always essential, but is desirable since it helps air supply and contributes to a better heating effect.

Meat, fish, shellfish, vegetables and other foodstuffs are placed over the grill 20 for broiling with the heat of the spherical surface of the grill as well as the heat and flame coming through the openings 4 of the noses 5. This enables the meat and other foodstuffs to be broiled evenly, permitting them to keep their juices to such a degree that they maintain their good taste.

The noses 5 are formed to provide end openings 4. The opening 4 is not only an outlet for the heat and flame for better broiling but also for ventilation for a better heating effect. The openings 4 of the noses 5 face outwardly either vertically or a little sloping downwards, to prevent water and grease coming from the foodstuffs while broiling from dropping back inside through the opening 4.

Since the spherical surface of the convex body 2 is sloping, food juice produced while broiling flows down into the peripheral groove 6. The juice thus obtained is available for eating if it is spooned. The width of the peripheral groove 6, therefore, should preferable be around 3 centimeters so that it may allow a spoon to enter.

While broiling meat and other food on the grill of the present invention, water and oil do not repel each other as they are collected in the peripheral groove. Furthermore, the heating effect of the heat source is not harmed as juice produced from broiled meat and other food does not drop on the heat source, thereby restricting the generation of smoke to a minimum and keeping the table clean.

If the grill of the present invention is used to broil meat and other food, it nevertheless lets some smoke generate. Such smoke may be removed effectively if the smoke extraction device of the present invention is also used. A preferred embodiment is shown in FIG. 4. A grill, such as the grill 20 of the present invention is placed over a heat source 16 which is fixed to the center of a table 15 and a substantially hemispherical hollow hood 8 having a wide opening at its bottom is hung over said heat source with the bottom edge 9 of said hood at the height of about 30 to 40 centimeters from the surface of the table. The table is also provided with a hole 17 into which one end of a slightly curved hollow pipe 10, of a diameter of about 5 to 10 centimeters, having open ends, is put tightly but removably, and the other end 11 of said pipe opens inside the hollow interior of said hood so that the pipe terminates a little above the bottom edge 9 of said hood and relatively close to the inside wall of said hood. To keep the hood at the above-mentioned height, a cord 18 from the ceiling may be employed by which the hood is suspended with a hook. Below the hole 17 on the underside of the table is mounted a connector 12 which is a hollow box, the bottom of which is a removable lid 13. One side of said connector has an opening 19 which connects with a ventilation duct 14.

The ventilation duct 14 may be provided with a fan (not shown in drawings) somewhere in the duct or at its end where it is connected with the connector 12. Such fan is not required if a separate power-operated central ventilation duct system is available to which the smoke extraction device of each table may simply be connected.

Smoke generated from the grill 20 is collected inside the hood 8 and is then caught by the upper opening 11 of the pipe 10, and is extracted through the pipe 10 and the ventilation duct 14. Experiments conducted by the inventor showed that the combination of the hood 8 and the pipe 10 has made it possible to extract smoke most effectively, and after the employment of the device smoke did not substantially remain outside of the hood in the dining room.

The shape of the hood is not necessarily limited to hemispherical and may be that of a pyramid or square box or other shape so long as it may receive smoke rising from the grill. However, a hemisphere is preferable in that it may achieve the best smoke collecting effect is easy to clean.

The upper opening 11 of the pipe 10 generally faces upward and may additionally face slightly inward or outward. Experiments showed, however, that the most effective smoke extraction was achieved when the face of the opening slants and faces outwards.

Acrylic resin or other plastics provide the most preferable materials for the manufacture of the hood 8 and pipe 10 because they are easy to clean, though a hood and pipe made of wood, metal or other materials may also work. The hood and pipe may or may not be transparent, but transparent ones are more preferable in that they transmit light to enable the customers to see or handle the food more easily. Also, the transparent ones visibly show how they are stained and how and when they should be cleaned.

The connector 12 connects the lower end of the pipe 10 to the ventilation duct 14. The bottom of the connector, i.e. the lid 13, is removable to clean the inside of the device of the stains caused by oil and carbon. The lid 13 may also work to catch oil and carbon to keep the ventilation duct clean. The pipe 10 may be connected with the ventilation duct directly, but it is advisable to provide the connector 12 because of the above-mentioned cleaning facility.

As is now apparent, a new and useful apparatus for cooking food and extracting smoke is provided that is effective, economical and suited for use in restaurant dining rooms. Although modifications might be suggested by those skilled in the art, it will be understood that I wish to embody within the scope of the patent described herein all such modifications as reasonable and properly come within the scope of my contribution to the art.

I claim:

1. A device for extracting smoke produced by cooking food, comprising a table on which the food is cooked, having a hole formed through its surface, a downwardly opening hood for collecting smoke supported above said table, means supporting said hood independent of said table, a hollow pipe having an open upper end positioned inside said hood above the lower edge of said hood and a lower end inserted tightly but removably into said hole, said pipe having no structural connection to said hood and a ventilation duct connected to said lower end of said hollow pipe leading away from said table to external exhaust.

2. A device for extracting smoke according to claim 1, wherein said hood is suspended from a ceiling by a cord.

3. A device for extracting smoke according to claim 1, wherein said hood is substantially hemispherical.

4. A device for extracting smoke according to claim 3, wherein said upper open end of said hollow pipe slants and faces outward adjacent a curved wall of said hemispherical hood.

5. A device for extracting smoke according to claim 1, wherein said hood is made of transparent acrylic resin.

6. A device for extracting smoke according to claim 1, wherein said hollow pipe is made of transparent acrylic resin.

7. A device for extracting smoke according to claim 1, further comprising connector means between said lower end of said hollow pipe and said ventilation duct, said connector means being mounted on the underside of said table and having a removable lid for cleaning purposes.

8. A device for extracting smoke according to claim 1 further comprising heating means fixed to said table below said hood.

9. An apparatus for cooking food and extracting the smoke produced thereby, comprising:
a table with a hole formed through its surface;
heating means fixed to the table surface;

a grill placed atop said heating means, said grill comprising:
an upwardly convex central body,
a plurality of raised noses formed on the surface of said central body, said noses being directed radially outward from the upper surface of said therein;
a peripheral groove for collecting juices encircling said central body; and
a sidewall encircling said peripheral groove;
a downwardly opening hood for collecting smoke supported above said heating means by means independent of said table;
a hollow pipe having an open upper end positioned inside said hood above the lower edge of said hood and a lower end inserted tightly but removably into said hole through said table, said pipe having no structural connection to said hood; and a ventilation duct connected to said lower end leading away from said table to external exhaust.

10. An apparatus for cooking food and extracting smoke according to claim 19, further characterized by having a circular hole formed in the center of said central body of said grill.

11. An apparatus for cooking food and extracting smoke according to claim 9, wherein said central body of said grill is spherical.

12. An apparatus for cooking food and extracting smoke according to claim 9, wherein said hood is suspended from a ceiling by a cord.

13. An apparatus for cooking food and extracting smoke according to claim 9, wherein said hood is substantially hemispherical.

14. An apparatus for cooking food and extracting smoke according to claim 13, wherein said open upper end of said hollow pipe slants and faces outward adjacent a curved wall of said hemispherical hood.

15. An apparatus for cooking food and extracting smoke according to claim 9, wherein said hood is made of transparent acrylic resin.

16. An apparatus for cooking food and extracting smoke according to claim 9, wherein said hollow pipe is made of transparent acrylic resin.

17. An apparatus for cooking food and extracting smoke according to claim 9, further comprising connector means between said lower end of said hollow pipe and said ventilation duct, said connector means being mounted on the underside of said table and having a removeable lid for cleaning purposes.

* * * * *

UNITED STATES PATENT AND TRADEMARK OFFICE
CERTIFICATE OF CORRECTION

PATENT NO. : 4,436,023
DATED : March 13, 1984
INVENTOR(S) : Kensuke Takahashi

It is certified that error appears in the above—identified patent and that said Letters Patent is hereby corrected as shown below:

In column 1, line 59, after the word "in" remove the word "of".

In column 3, line 61, after the word "effect" add the word --and--.

In claim 9, column 5, line 7, preceeding the word "therein" insert the words --central body and having end openings formed--.

In claim 10, column 5, line 24, change the numeral "19" to read --9--.

Signed and Sealed this

Twenty-fifth Day of September 1984

[SEAL]

Attest:

GERALD J. MOSSINGHOFF

Attesting Officer

Commissioner of Patents and Trademarks